United States Patent
Hohman (10) Patent No.: US 6,425,342 B1
(45) Date of Patent: *Jul. 30, 2002

(54) METHOD OF CAUTIONARY WARNING ON VESSELS AND A REMOVABLE CAUTIONARY WARNING DEVICE

(76) Inventor: Dale E. Hohman, 4015 Circle Dr., Bakerstown, PA (US) 15007-9709

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,876

(22) Filed: Oct. 23, 1997

(51) Int. Cl.[7] .......................... G02B 5/124; G02B 5/136; G02B 5/12
(52) U.S. Cl. .................... 116/201; 359/530; 359/533; 359/538; 359/548
(58) Field of Search ................. 116/26, 28 R, 116/201, 209; 359/515, 546, 548, 549, 520, 529, 530, 533, 538

(56) References Cited

U.S. PATENT DOCUMENTS

| | | | |
|---|---|---|---|
| 2,859,662 A | 11/1958 | Rider | |
| 3,017,713 A | * 1/1962 | Butler | 359/549 |
| 3,670,438 A | 6/1972 | Carroll | |
| 3,696,238 A | 10/1972 | Szymanski | |
| 3,952,694 A | * 4/1976 | McDonald | 116/209 |
| 4,047,802 A | 9/1977 | Pieters | |
| 4,053,233 A | * 10/1977 | Bien et al. | 356/141 |
| 4,205,619 A | * 6/1980 | Mock, Jr. et al. | 116/67 R |
| 4,223,980 A | 9/1980 | Shafar | |
| 4,256,366 A | 3/1981 | Buckelew | |
| 4,299,442 A | 11/1981 | Buckelew | |
| 4,573,763 A | 3/1986 | Thomas | |
| 4,677,010 A | * 6/1987 | Selwyn | 428/40 |
| 4,815,818 A | 3/1989 | Thomas | |
| 5,156,274 A | 10/1992 | Williams | |
| 5,263,272 A | 11/1993 | Fogelman | |
| 5,323,728 A | 6/1994 | Hjelm | |
| 5,358,770 A | 10/1994 | Evans | |
| 5,398,437 A | 3/1995 | Bump | |
| 5,452,508 A | 9/1995 | Wu | |
| 5,495,401 A | * 2/1996 | Evans | 116/26 |
| 5,691,846 A | * 11/1997 | Benson, Jr. et al. | 359/530 |
| 5,764,413 A | * 6/1998 | Smith et al. | 359/530 |
| 5,905,826 A | * 5/1999 | Benson, Jr. et al. | 385/31 |

FOREIGN PATENT DOCUMENTS

| | | | | |
|---|---|---|---|---|
| DE | 2027485 | * | 12/1971 | 116/28 R |
| GB | 2 238 172 A | * | 5/1991 | H01F/7/00 |
| JP | 1271702 | * | 10/1989 | 359/546 |

* cited by examiner

*Primary Examiner*—Daniel S. Larkin
*Assistant Examiner*—Rose M. Miller
(74) *Attorney, Agent, or Firm*—Bartony & Hare (57) ABSTRACT

The present invention provides a method for providing a cautionary warning on water-going vessels. The method comprises the step of placing a plurality of reflective warning markers on at least one side of the vessel. These warning markers preferably comprise a front, reflective (that is, reflecting incident light) surface and a rear surface. The rear surface comprises an attachment mechanism adapted to attach to the surface of the side of the vessel. Preferably the attachment mechanism is coextensive with at least the perimeter of the front, reflective surface. The present invention also provides a removable informative marker. This marker comprises a resilient, front reflective surface and a resilient, back magnetic surface. The resilient back magnetic surface is preferably substantially coextensive with at least the perimeter of the resilient, front reflective surface to assist in assuring a firm attachment of the marker to a metallic surface. The removable, reflective marker of the present invention is particularly useful as a safety signal and is removably attachable to any magnetic surface.

9 Claims, 9 Drawing Sheets

METHOD OF CAUTIONARY WARNING ON VESSELS AND A REMOVABLE CAUTIONARY WARNING DEVICE

FIELD OF THE INVENTION

The present invention relates to a method of providing cautionary warning on vessels and to a cautionary warning device.

BACKGROUND OF THE INVENTION

In general, there is no method or device in use for visibly marking the sides of powered vessels or vessels under tow at night other than a single light illuminated on the bow of the vessel and showing to the side. In some cases there is an additional light illuminated on the stern and showing to the side. Although powered vessels typically have deck lighting, such lights are invariably turned off at night to enable the captain to see and navigate safely in the darkness.

Some tows on the river system, however, are up to 1400 feet long. During times of reduced visibility, there is clearly an excessively long unmarked area on such vessels. Other crafts of any size (but, particularly, small ones) are not likely to recognize the presence of the vessel and the risk of collision is thus unacceptably high.

It is, therefore, very desirable to develop methods and devices for reducing the risk of collision.

SUMMARY OF THE INVENTION

In general, the present invention provides a method for providing a cautionary warning on water-going vessels. The method comprises the step of placing a plurality of reflective warning markers on at least on one side of the vessel. Preferably, the reflective working markers are placed on at least two sides of the vessel. These warning markers preferably comprise a front, reflective (that is, reflecting incident light) surface and a rear surface. The rear surface comprises an attachment mechanism adapted to attach to the surface of the side of the vessel. Preferably the attachment mechanism is coextensive with at least the perimeter of the front, reflective surface.

In one embodiment, the attachment mechanism comprises an adhesive layer. Preferably, the marker is removably attachable to the surface of the side of the vessel. For example, the attachment mechanism may comprise one or more magnetic surfaces or layers. Preferably, each of the front, reflective surface and the attachment mechanism are suitably resilient to enable the marker to conform to uneven surfaces.

The present invention also provides generally a removable informative marker. This marker comprises a resilient, front reflective surface and a resilient, back magnetic surface. The resilient back magnetic surface is preferably substantially coextensive with at least the perimeter of the resilient, front reflective surface to assist in assuring a firm attachment of the marker to a metallic surface. The removable, reflective marker of the present invention is particularly useful as a safety signal and is removably attachable to any magnetic surface. Preferably, the present removable, reflective markers are sufficiently large and reflect a sufficient percentage of incident light to make the markers clearly visible under conditions of reduced visibility (for example, at night) from a relatively long distance.

As set forth above, a particularly advantageous method of using the present invention is as a reflective safety signal on vessels (for example, barges). However, the markers of the present invention are well suited for any use in which it is desirable to attach a removable indicating or signaling surface or marker to a metallic substrate. The present surfaces may or may not be color coded or have written messages thereon.

DETAILED DESCRIPTION OF THE INVENTION

The present methods and devices can be used to mark the presence of a tow or vessel of any length. In that regard, the present invention provides generally a reflective safety or warning marker 10. Preferably, the markers comprise a first or front surface 20 comprising a reflective material suitable to reflect incident light. Surface 20 may, for example, be diffusely reflective which means that an incident beam is reflected omni-directionally according to Lambert's cosine law. Preferably, surface 20 is retroreflective in that an incident beam is returned in substantially the same direction from which the incident beam came over a wide range of directions. Preferably, the reflective material has a coefficient of reflectivity or retroreflectivity of at least 10%. The reflective material is preferably suitably resilient to enable front surface 20 to conform to virtually any shape or surface. Likewise, the reflective material is preferably durable enough to allow extended use thereof outdoors.

An example of a reflective/retroreflective material suitable for use in the present invention is SCOTCHLITE™ Plus Flexible Reflective Sheeting Series 580 available from 3M of Saint Paul, Minn. That material is a durable, flexible enclosed lens reflective sheeting available in numerous colors and is described in detain in 3M Product Bulletin 580 Plus, the disclosure of which is incorporated herein by reference.

Markers 10 also comprise a second or rear surface 30 comprising an attachment mechanism 40 to attach the marker to the vessel. Attachment mechanism 40 is preferably chosen to not inhibit the resilient nature of front, reflective surface 20.

Markers 10 can be placed in any increment to mark the length of substantially any vessel or vessels to visually warn other vessels or craft without compromising the watertight integrity of a vessel. Preferably, attachment mechanism 40 attaches to the surface of the vessel without invasive or damaging surface preparation (for example, without the need to weld, drill or rivet, each of which procedures can result in damage to a vessel). Some surfaces (such as the side of a vessel, the side of a fuel bunker, a hazardous material cargo container or a combustible material cargo container) cannot be welded or riveting because the danger of leakage, ignition, and/or explosion.

Figure 1:
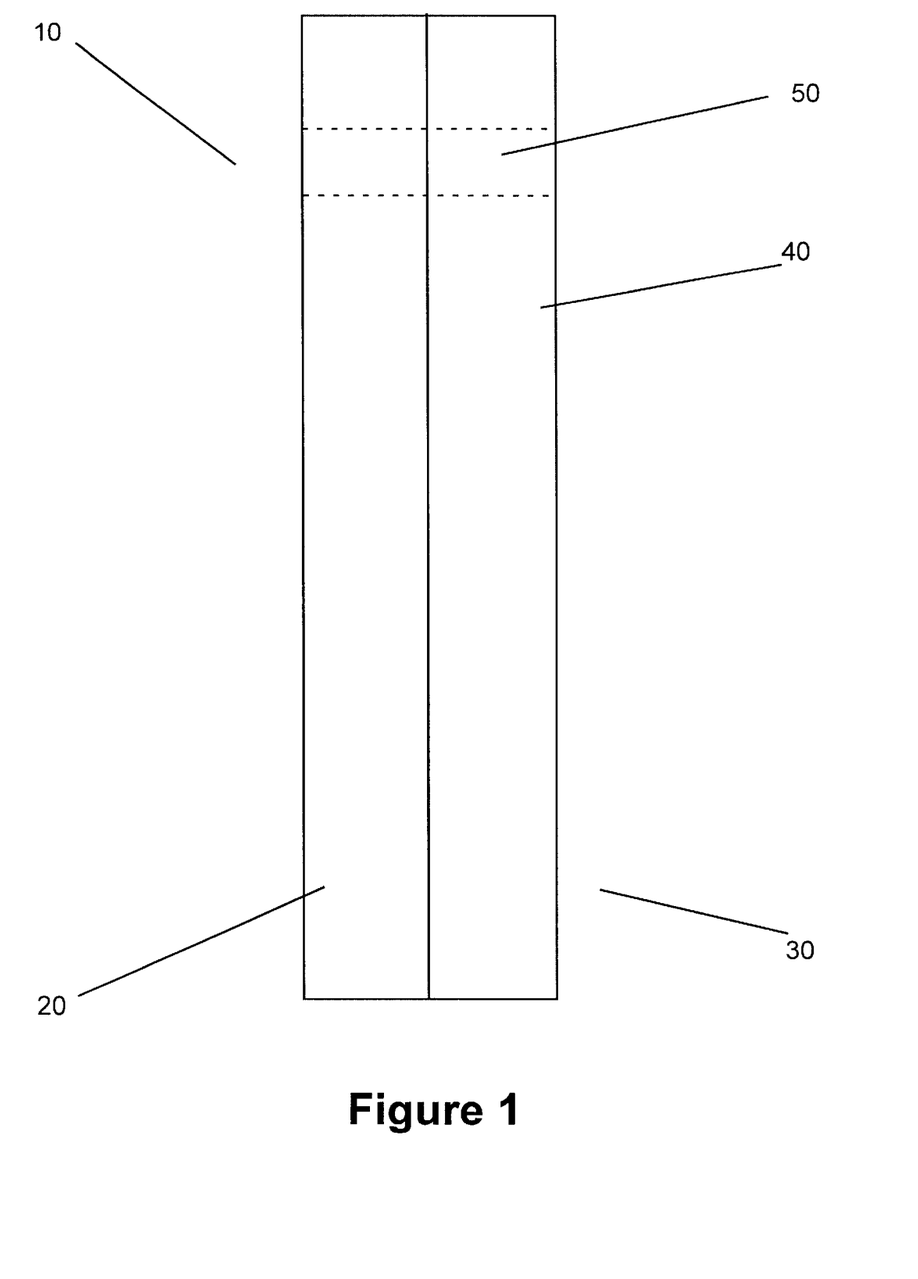
FIG. 1 illustrates a side view of one embodiment of the present invention.
Figure 2A:
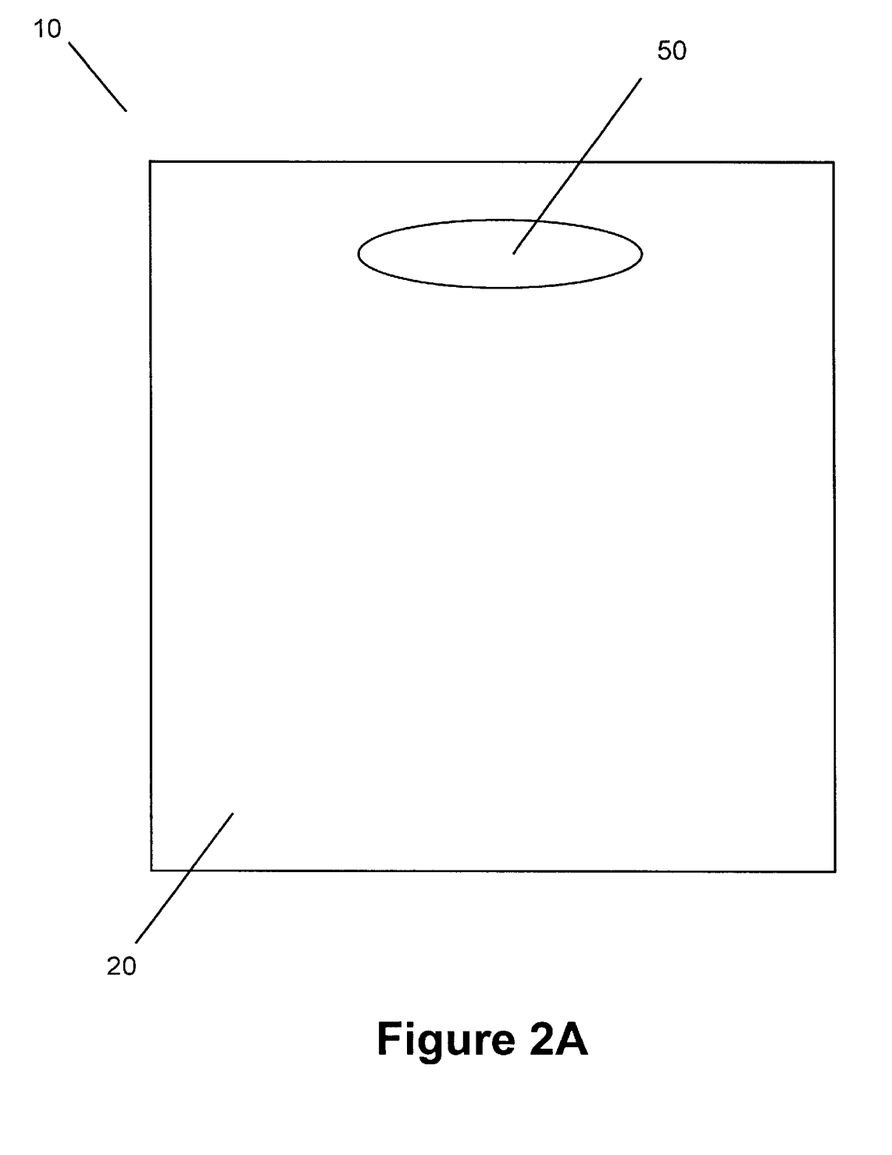
FIG. 2A illustrates a front view of the embodiment of FIG. 1.
Figure 2B:
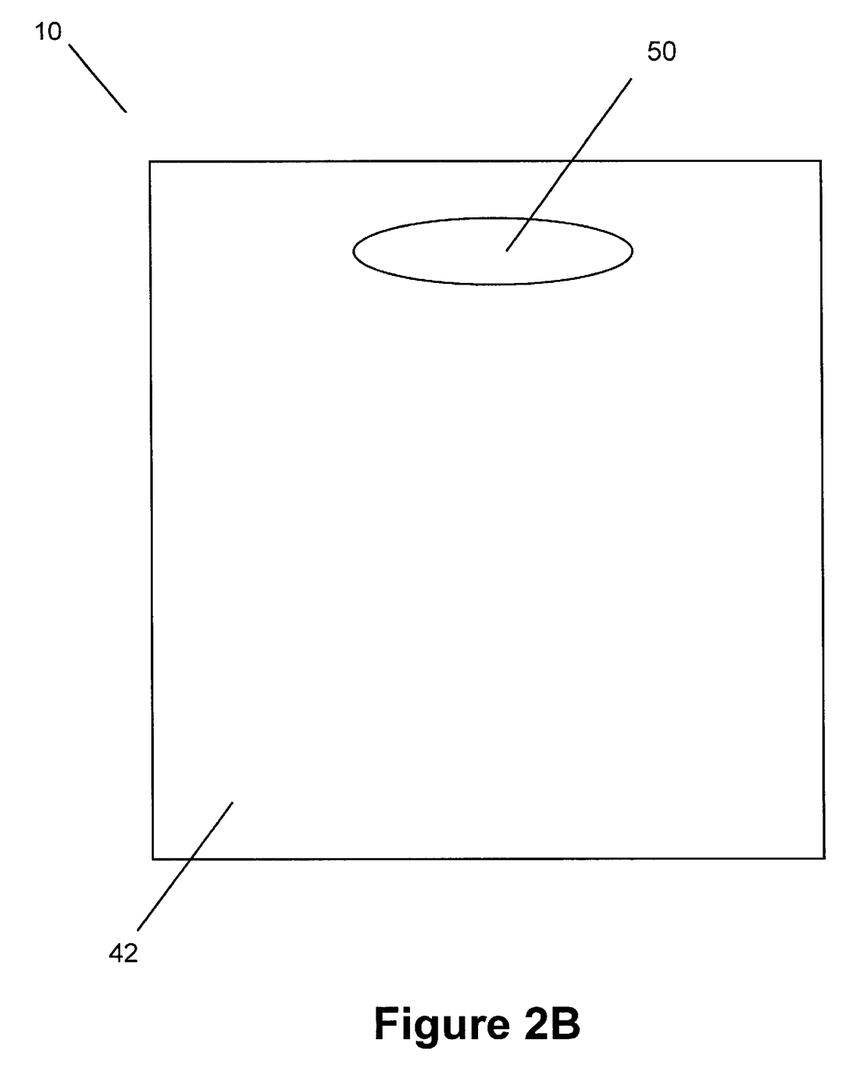
FIG. 2B illustrates a rear view of the embodiment of FIG. 1 in which the magnetic surface comprising the attachment member is substantially coextensive with the entire surface area of the front, reflective surface (which is equivalent to the surface area of the rear surface and the marker).
Figure 2C:
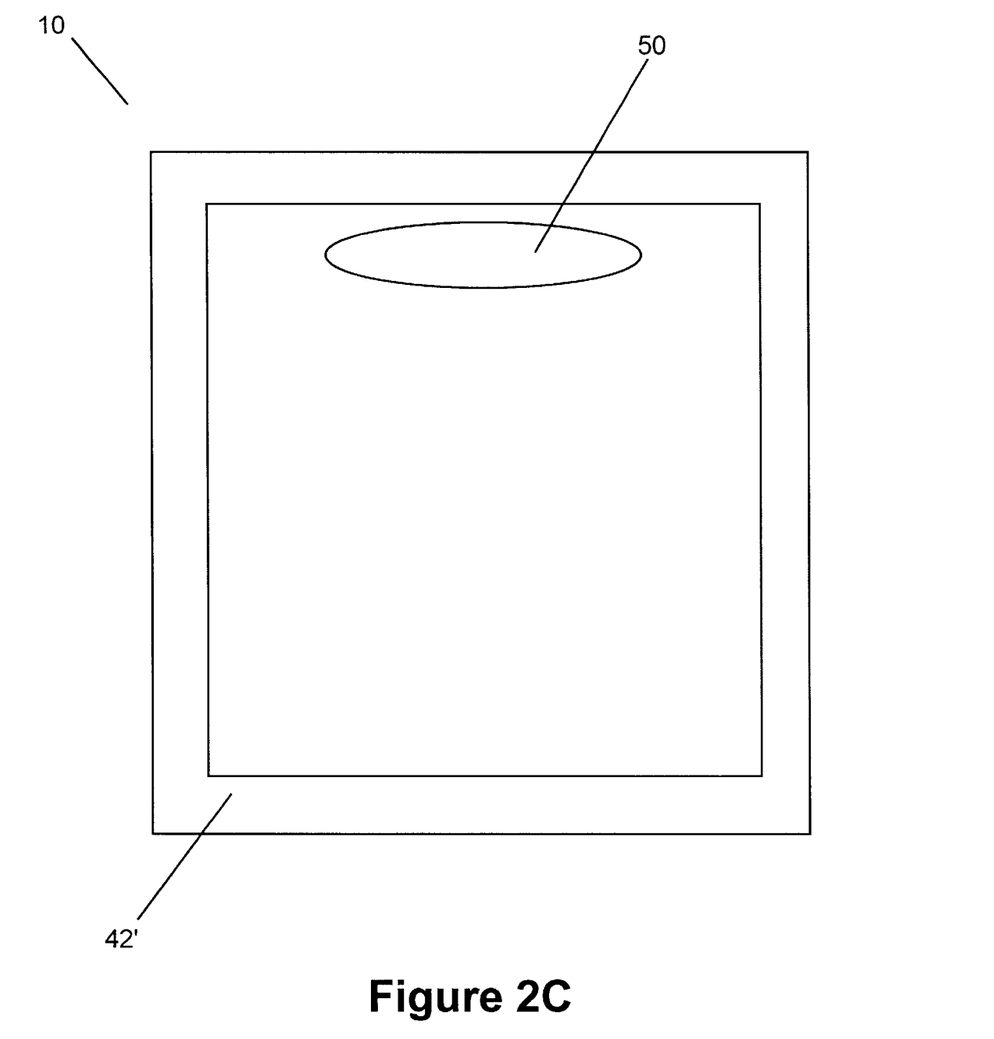
FIG. 2C illustrates the embodiment of FIG. 1 in which the magnetic surface comprising the attachment member is substantially coextensive with the perimeter of the marker.

Attachment mechanism 40 is preferably substantially coextensive with at least the perimeter of rear surface 30 of marker 10 (as illustrated in FIG. 2C) to prevent an unsecured portion of the perimeter of marker 10 from "catching the wind" and causing undesirable detachment of marker 10 from the surface of the vessel. More preferably, attachment member 40 is substantially coextensive with the entire surface area of rear surface 30 as illustrated in FIG. 2B. Attachment mechanism 40 can comprise, for example, an adhesive layer. The Scotchlite material includes, for example, a pressure activated adhesive material that allows positioning and repositioning of marker 10.

In a preferred embodiment illustrated in FIGS. 2A through 2C, markers 10 are removably attachable to the surface of the vessel. For example, front surface 20 can comprise a resilient, reflective material, and a rear attachment mechanism or surface 42 can comprise a resilient magnetic material. Magnetic layer 42 that will securely and removably affix to many metallic surfaces. Reflective material surface 20 preferably is easily alterable to meet the requirements of a specific purpose. Numerous colors (for example, yellow, orange, red, white, green, blue, etc.) can be used. The size and shape of marker 20 is preferably easily adjustable (for example, by cutting) to any space or location of installation. A "cut-out" handle 50 may be provided for ease of transportation and/or storage. As illustrated in FIG. 2C, a magnetic surface layer 42' is preferably provided that is coextensive with at least the perimeter of marker 10 as described above. Magnetic sheeting suitable to form magnetic layers 42 or 42' is available, for example, from Pioneer Supply Company of Pittsburgh, Penn.

Figure 3A:
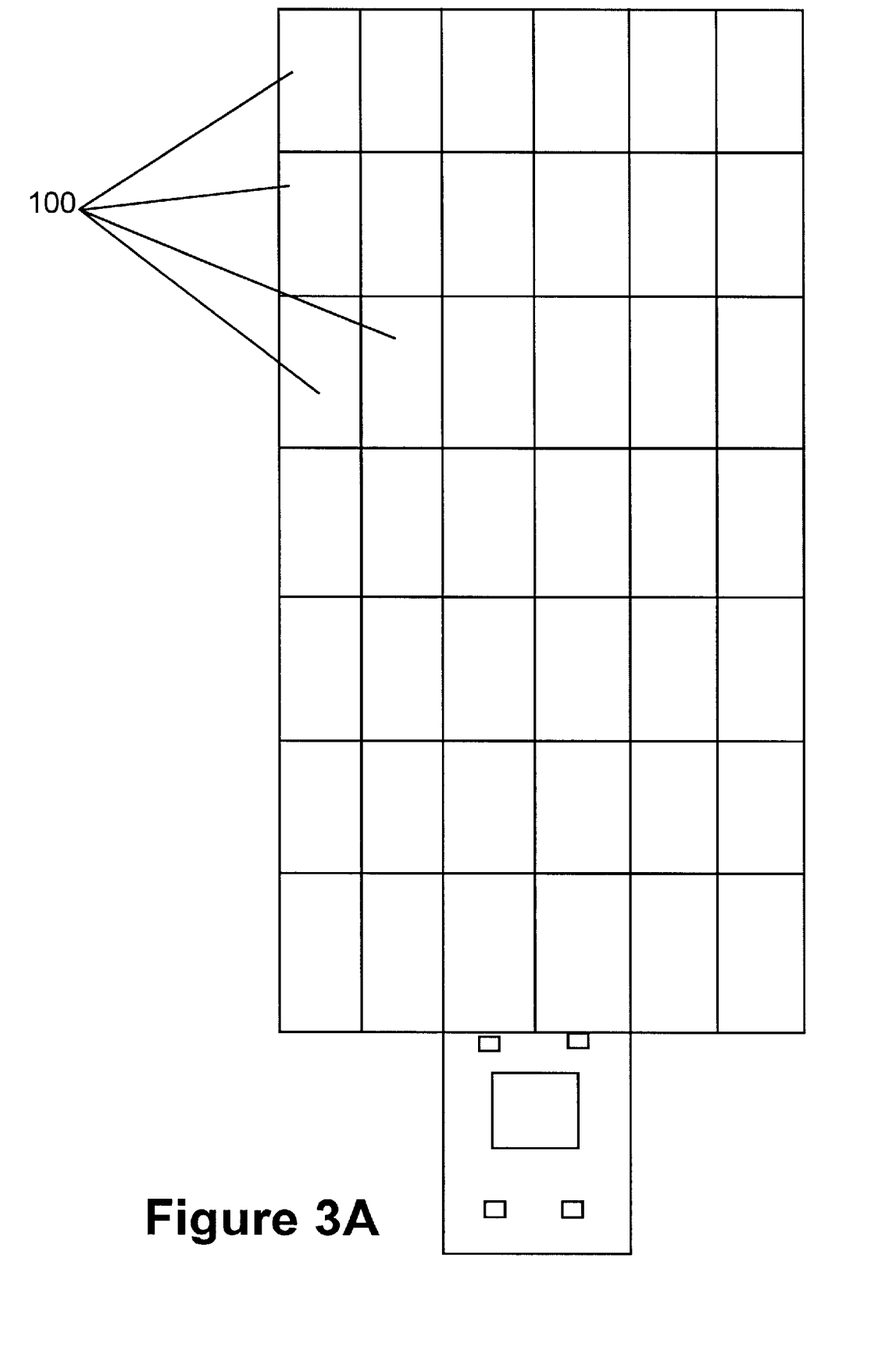
FIG. 3A illustrates a plan view of a tow of barges upon which the present can be used.
Figure 3B:
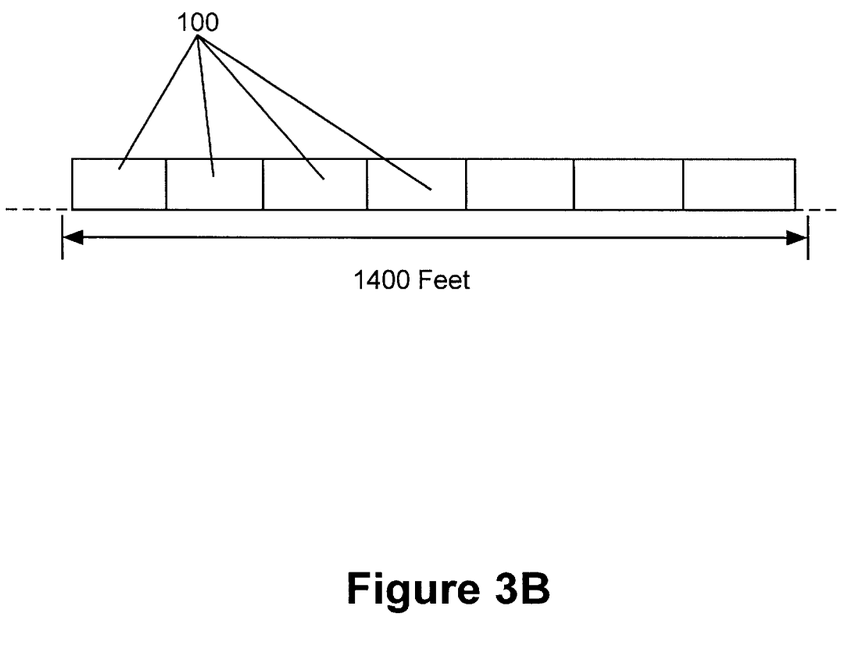
FIG. 3B illustrates a side view of the tow of FIG. 3A.

Some tows have up to 40 or more barges in tow (See FIG. 3A) and would require approximately 420 markers 10 on the sides thereof to adequately mark every barge in tow. In the case that markers 10 are removable, only the outside barges in tow need be marked, however. To mark every 50 lineal feet on the outside barges of the tow represented in FIGS. 3A and 3B would require only 28 markers 10 on each side of the tow. Existing vessels are easily retrofitted. Markers 10 can preferably be removed readily when the tow of barges is delivered to its destination. Markers 10 are also preferably readily removable for change of draft or repainting of the vessel or vessels. If desired, however, markers 10 can be left on large vessels or ships where it would be inconvenient to remove them (such as in bad weather or constant transit).

Markers 10 can also be used to mark a vessel's presence if moored in or near a hazardous location when lighting is not an option because of some constraint. Likewise, markers 10 can be used to mark recent marine casualties (that is, shipwrecks) that are partially submerged or showing.

Figure 3C:
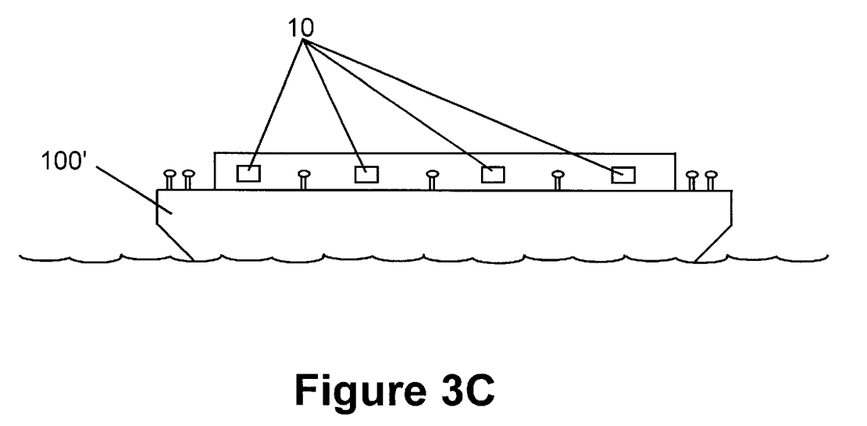
FIG. 3C illustrates the use of the markers of the present invention on the side-facing surface of bulwarks of a single barge.
Figure 3D:
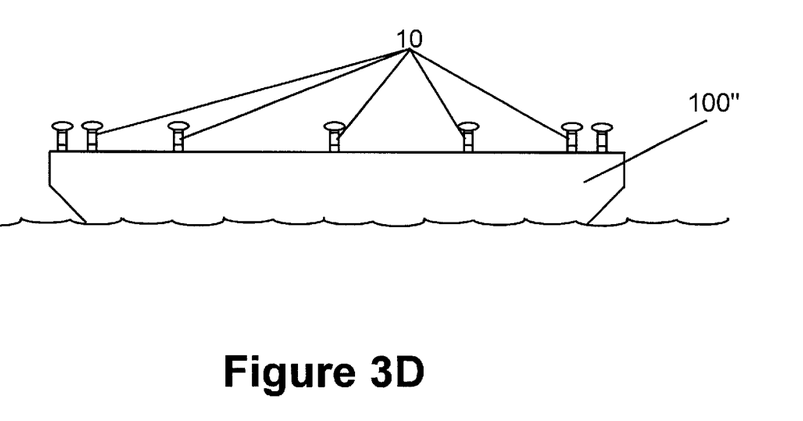
FIG. 3D illustrates the use of the markers of the present invention on the side-facing surface of cylindrical check posts of a barge without bulwarks.

FIG. 3C illustrates markers 10 on a barge 100' with bulwarks. Because of the resilient, flexible nature of markers 10, absolutely flat installation surfaces are not required. For example, some flat deck barges and/or dry cargo barges 100" are not fitted with bulwarks along the sides. In such cases, resilient markers 10 can be wrapped or molded around the outboard side of the steel check posts or heads (See FIG. 3D). Markers 10 can also be appropriately colored (for example, red or green) to provide indications such as whether the port or starboard side of the vessel is in view.

Figure 4:
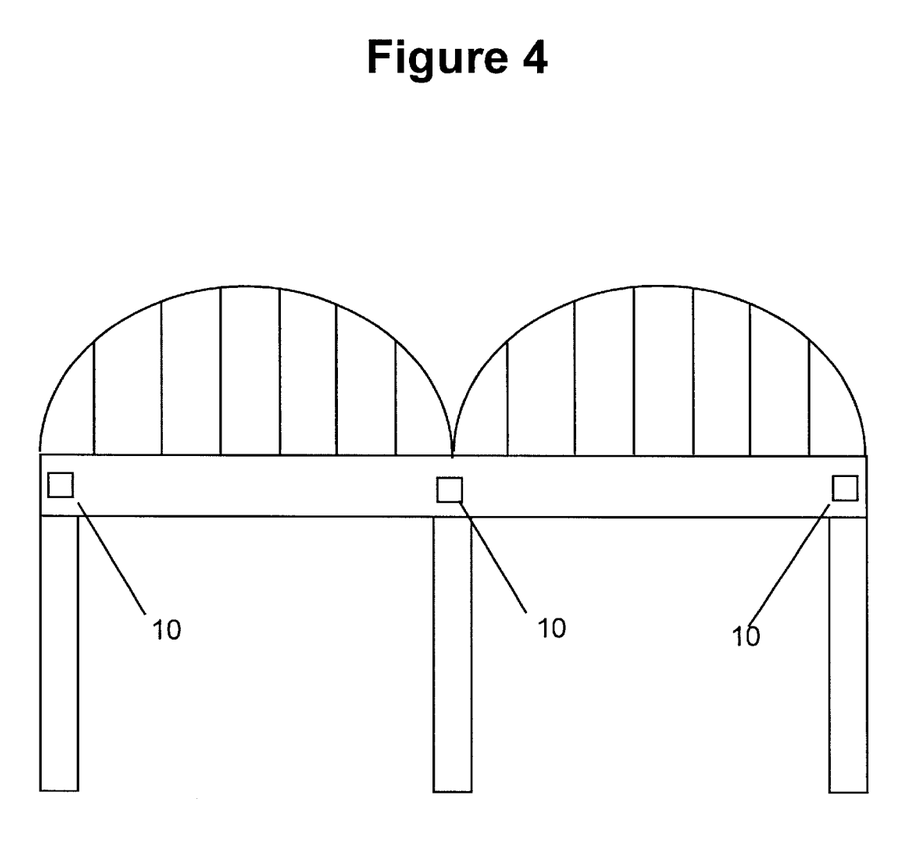
FIG. 4 illustrates the use of the markers of the present invention on a typical bridge spanning water.

Removable, magnetic markers 10 are not limited to use on vessels, however. For example, markers 10 can also be used on steel bridges as illustrated in FIG. 4. These bridges are currently marked with red and green lights—red to indicate a hazard or a pier, green to mark a channel or a navigable pass. Frequently these lights burn out from the vibration of the bridge. Reflective red and green magnetic markers 10, for example, can be used in addition or in lieu of such lights. If the light goes out, the mariners can use their vessels search light to locate markers 10.

Removable markers 10 of the present invention can further be used by Federal and State Departments of Transportation for "cover ups". An example would be to change routes or detours, especially temporarily on their large reflective ferrous metal signs. Further examples include changing arrows, changing exits, changing numbers or letters, and changing names without permanently marking or defacing the sign.

Figure 5A:
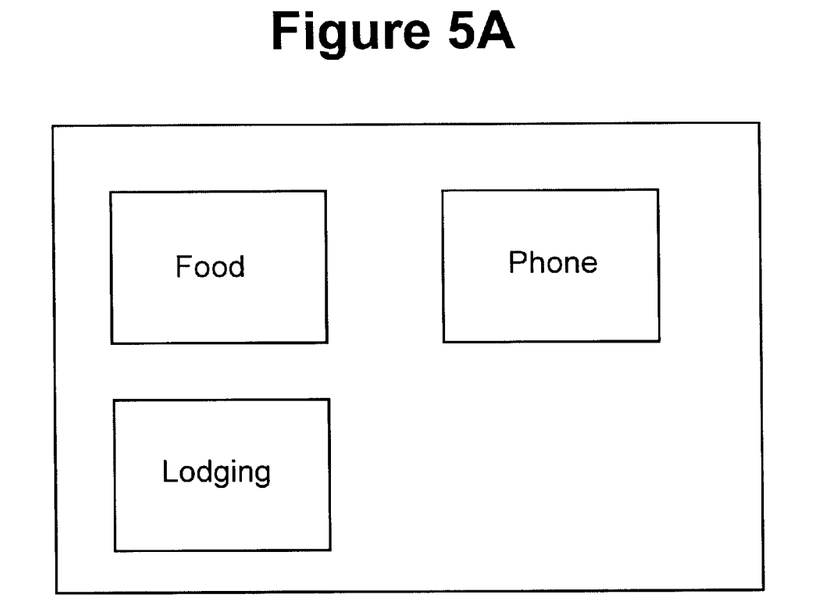
FIGS. 5A and 5B illustrate the use of the markers of the present invention to temporarily alter a road sign.
Figure 5B:
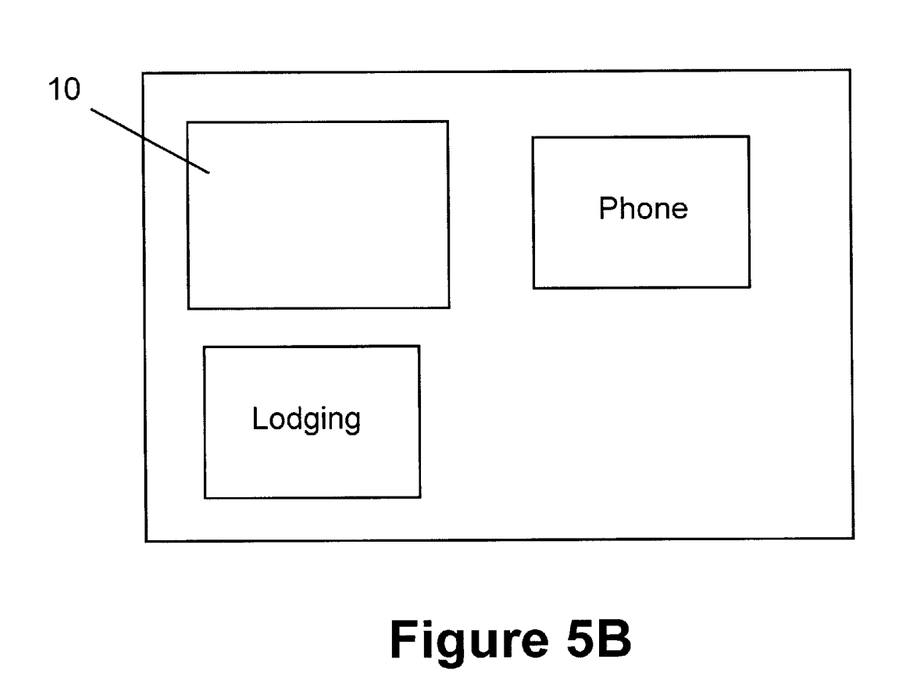

On highway signs that are reflective, such as signs for restaurants at certain exits, if an establishment or exit closes, one can place a magnetic "cover up" marker 10 with nearly the same color as the field of the entire sign. One can also change logos or add restaurant signs without changing the entire reflective sign (See FIGS. 5A and 5B).

Many other uses are possible for reflective markers 10. For example, marking construction trucks with removable lane change arrows or other warnings; marking steel girders of bridges for clearance markers or warnings (for example, "Clearance 14'6'"); and marking high structures so that in the case that marker lights go out, air craft may still be able to locate such high structures from light reflected from search lights or landing lights.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A method for providing a cautionary warning on water-going vessels, the vessels being organized on the water into a towing array of multiple columns of vessels and multiple rows of vessels during floatation of the vessels on the water, the method comprising the step of placing a plurality of removable reflective warning markers at any desired spacing on at least one outer facing side of the array of vessels by removably attaching the reflective warning markers to the vessels on the one outer side of the array of vessels, the warning markers comprising a front, reflective surface and a rear surface, the front reflective surface having a coefficient of retroreflection of at least 10% such that the reflective surface is visible from a direction substantially the same as a direction from which light reaches the reflective surface without the need to supply power to the reflective warning markers, the rear surface comprising an attachment mechanism adapted to removably attach to the surface of the side of the vessel.

2. The method of claim 1 wherein the attachment mechanism comprises a magnetic layer.

3. The method of claim 2 wherein the magnetic layer is substantially coextensive with at least the perimeter of the marker.

4. The method of claim 3 wherein each of the front, reflective surface and the magnetic layer are suitably resilient to enable the marker to conform to non-flat surfaces.

5. The method of claim 4 wherein the markers are appropriately colored to indicate if the side of the array of vessels is the starboard or port side of the array of vessels.

6. The method of claim 1 wherein the vessels are barges.

7. The method of claim 1 wherein the markers are appropriately colored to indicate if the side of the array of vessels is the starboard or port side of the array of vessels.

8. A method for providing a cautionary warning on barges that are organized on the water into a towing array of multiple columns and multiple rows, the method comprising the step of placing a plurality of removable reflective warning markers on at least one outer facing side of the array of barges by removably attaching the reflective warning markers to the barges on the one outer side of the array of barges, the warning markers comprising a front, reflective surface and a rear surface, the front reflective surface having a coefficient of retroreflection of at least 10% such that the reflective surface is visible from a direction substantially the same as a direction from which light reaches the reflective surface without the need to supply power to the reflective warning markers, the rear surface comprising an attachment mechanism adapted to removably attach to the surface of the side of the barge.

9. The method of claim 8 wherein the attachment mechanism includes at least one magnetic element on the rear surface of the reflective warning marker.

* * * * *